Patented Apr. 26, 1938

2,115,412

UNITED STATES PATENT OFFICE 2,115,412

REDDISH YELLOW INSOLUBLE MONOAZO DYES

Miles Augustinus Dahlen and Newell Meade Bigelow, Wilmington, and Frithjof Zwilgmeyer, Arden, Del., assignors to E. I. du Pont de Nemours & Company, Wilmington, Del., a corporation of Delaware No Drawing. Application December 20, 1935, Serial No. 55,410

8 Claims. (Cl. 260—86)

This invention relates to new compounds, to new compositions of matter, to processes of dyeing and to processes of making the new compounds. More particularly the invention relates to new compositions of matter including azo dyes, and to processes of employing them, particularly in printing processes. The invention will be described with reference to particular examples which are illustrative but not limitative thereof.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized, and is reacted with the second component, usually in solution.

The azo dyes of the prior art are applied by one of several processes that have been devised to take advantage of the nature of particular dyes: (a) The dyestuff is dissolved or dispersed in a suitable liquid medium and the material to be dyed is dipped therein. Satisfactory results are obtained by this method only if the completed dyestuff is substantive to the material which is to be dyed. (b) A substantive coupling component, or a substantive azo component, is directly affixed to the material, and the diazotized component or the coupling component, respectively, is coupled thereto, completing the dye on the material. (c) An azo component is diazotized and coupled to a compound with which it forms a new compound stable in alkaline or neutral medium, and is mixed with the coupling component and with the other ingredients of a basic or neutral printing paste, or solution. The material to be dyed is impregnated with the paste, or with the solution, by printing or in any other satisfactory manner and the dye is formed on the material by reaction with an acid, whereby it is freed and enabled to react with the coupling component. This invention relates to new compositions of matter to be applied by the third of these methods, and to processes of applying them.

It is an object of the invention to prepare new compounds and to prepare new compositions of matter suitable for the dyeing of textile fibers and other dye-susceptible materials. Another object of the invention is to prepare mixtures of stable, water-soluble diazoimino compounds and diazotized arylamines capable of coupling with diazo salts. Another object of the invention is to prepare the new compounds and new compositions of matter of this invention by methods which are economically and technically satisfactory. Another object of the invention is to produce materials dyed in satisfactory shades of reddish yellow. Other objects of the invention will be in part apparent and in part more fully hereinafter set forth.

A major object of the invention is accomplished by dyeing dye-susceptible materials with compounds formed by coupling a diazotized arylamine represented by the formula

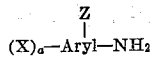

in which Z is one of a group consisting of hydrogen, amino and an n-auxochrome, X is one of a group consisting of hydrogen and an n-auxochrome and $a$ is an integer at least 2 less than the number of carbon atoms in Aryl, with a compound represented by the formula

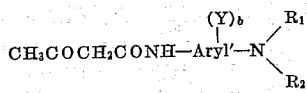

in which Y is one of a group consisting of hydrogen and an n-auxochrome, $b$ is an integer at least 2 less than the number of carbon atoms in Aryl', $R_1$ is one of a group consisting of hydrogen, alkyl, aryl, and aralkyl, $R_2$ is one of a group consisting of alkyl, aryl, aralkyl, and acyl and $R_1$ and $R_2$ may be nuclear elements of one heterocyclic radical. Another object of the invention is attained by stabilizing a diazotized arylamine of the said formula against reaction in non-acid medium, and incorporating it in a non-acid medium with an aceto-acetyl-arylamine of the said formula. Another object of the invention is attained by impregnating a dye-susceptible material with one of the said new compositions of matter and exposing it to the action of acid fumes. Another object of the invention is accomplished by preparing the new compounds and compositions of matter by technically and economically satisfactory methods, the details of certain of which are more fully hereinafter set forth.

In the practice of the invention the azo component is stabilized against reaction in alkaline or neutral medium with a coupling component either by forming the nitrosamine or a diazoimino compound thereof, of which both methods will be understood by persons skilled in the art. The stabilized azo component will then be mixed in the form of dry powder, a paste, or a solution with the alkaline or neutral mass containing the coupling component. The details of the processes of practicing the invention will differ somewhat according to the state of the ingredients but the general method is to impregnate the colorable material with the so-formed mixture, and to act upon it with enough acid to regenerate the azo component and permit it to act upon the coupling component.

In the form of the invention which involves the dyeing of a cloth by the so-called process of printing, the azo component, diazotized and stabilized as hereinabove described, is mixed in a basic paste with the coupling component, the paste is applied to an etched or "printing" roller which impregnates the fabric by contact, the fabric is placed in a closed container, and is subjected for a few seconds, at elevated temperature and usually in the presence of water vapor, to the action of the fumes of an acid which neutralizes the basicity of the paste, breaks up the stabilized complex, and frees the azo component for reaction with the coupling component.

The aryl components of the new dyestuffs may advantageously include as nuclear substituents one or more of the n-auxochromes. The n-auxochromes we define to consist of the group alkyl, alkoxy, aryl, aralkyl, aralkoxy, aryloxy, hydroaryl, hydro-aryloxy, nitro, halogen, and trifluoromethyl. Generally speaking, satisfactory results are obtained by the use of azo components having from 0 to 3 of such substituents and the use of larger numbers of n-auxochrome substituents does not appear to produce results advantageous enough to warrant the extra expense of incorporating them. It is also possible to incorporate in the aryl nuclei water-solubilizing substituents such as the carboxylic and sulfonic acid groups, but such incorporation tends to water-solubilize colors and make them useless for ordinary dyeing purposes. Consequently, such substituents will be used only in those comparatively rare instances when a water-soluble color is desired.

Illustrative of the general utility as azo components of primary arylamines are the following:

Ortho-chloro-aniline
2,5-dichloro-aniline
4-chloro-2-amino-phenetol
Ortho-anisidine
4-chloro-2,5-dimethyl-aniline
4-benzoyl-amino-2,5-dimethoxy-aniline
5-nitro-2-amino-anisole
1-methoxy-2-naphthylamine
4-chloro-2-amino-diphenyl-ether
Meta-amino-benzo-trifluoride
Ortho-amino-azo-toluene
4,4'-diamino-diphenylamine
3-amino-carbazole.

It will be observed that aryldiamines may be used with success. The diazo components may be amines and diamines of the various aromatic series: As examples thereof amines and diamines of the benzene, naphthalene, diphenyl, anthracene, carbazole, azo-benzene, azoxy-benzene, diphenylamine, diphenyl-ether, phenanthrene, and pyrene series are cited.

Any of the usual stabilizing agents may be used in the preparation of water-soluble diazoimino compounds. The following are exemplary, but not limitative, of the class:

Sarcosin
1-methyl-amino-ethane-2-sulfonic-acid
Proline
Nipecotinic-acid
Benzylene-imine-para-sulfonic-acid
1-naphylamine-2.4.8-trisulfonic-acid
2-ethyl-amino-4-sulfo-benzoic-acid Examples of other derivatives of diazotized arylamines which are inactive toward coupling components under alkaline conditions, but which revert to the diazo form when reacted upon by acids, are for instance the so-called azo-sulfonates, compounds having the formula

aryl—N=N—SO₃—Na.

The following examples, in which parts are by weight, are designed to illustrate but not to limit the various features of the invention:

*Example I*

A printing paste was prepared according to the following formula:

| | Parts |
|---|---|
| 4 - carbo - methoxy - amino - 2,5 - diethoxy-aceto-acetanilide | 3.2 |
| The diazoimino compound derived from the reaction between diazotized 6-chloro-2-amino-toluene with the sodium salt of piperidine-alpha-carboxylic-acid in alkaline solution | 2.8 |
| Cellosolve | 6.0 |
| A 26% solution of sodium hydroxide | 2.0 |
| Starch-gum tragacanth thickener | 50.0 |
| Water at 140° F | 36.0 |
| Total | 100.0 |

Cotton goods were printed with this paste from an engraved copper roll, and then dried. The goods next were aged for 1.25 minutes in a 5% acetic-acid ager, rinsed, soaped for 1 minute at 160° F. in ½% soap solution, rinsed, and dried. The printed portions of the goods were dyed a reddish yellow by the dyestuff of the probable structure:

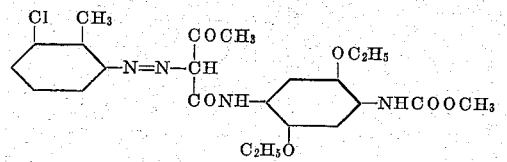

The dyeings possessed a good degree of resistance to light and laundering.

*Example II*

A printing paste was prepared according to the following formula:

| | Parts |
|---|---|
| 4 - benzoyl - amino - 2,5 - dimethoxy-aceto-acetanilide | 3.2 |
| The diazoimino derivative prepared by the reaction of diazotized 4-chloro-2-amino-anisole with the sodium salt of piperidine-alpha-carboxylic-acid in alkaline solution | 2.8 |
| Cellosolve | 6.0 |
| A 26% solution of sodium-hydroxide | 2.0 |
| Starch-gum tragacanth thickener | 50.0 |
| Water at 140° F | 36.0 |
| Total | 100.0 |

Cotton goods were printed with the paste described above from an engraved copper roll, and dried. The goods were exposed for 1.25 minutes to the vapors of boiling 5% acetic-acid, rinsed, soaped for 1 minute in ½% soap solution at 160° F., rinsed again and dried. The printed portions of the goods were dyed with a deep reddish yellow by the dyestuff of the probable structure:

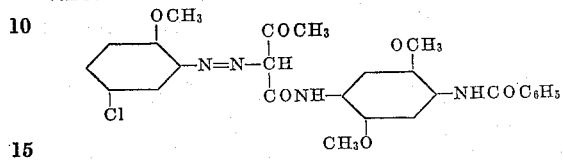

The dyeings possessed a high degree of fastness to light, soaping, and laundering.

*Example III*

A printing paste was prepared according to the following formula:

| | Parts |
|---|---|
| 4-benzoyl-amino-2,5-diethoxy-aceto-acetanilide | 3.2 |
| The diazoimino derivative prepared by the reaction of diazotized 4-chloro-2-amino-toluene with the sodium salt of piperidine-alpha-carboxylic-acid in alkaline solution | 2.8 |
| Cellosolve | 6.0 |
| A 26% solution of sodium-hydroxide | 2.0 |
| Starch-gum tragacanth thickener | 50.0 |
| Water at 140° F | 36.0 |
| Total | 100.0 |

Cotton goods were printed with the above described paste from an engraved copper roll. The printed goods were dried, and then aged for 1.25 minutes in a 5% acetic-acid ager. The developed prints were rinsed, soaped for 1 minute at 160° F. in ½% soap solution, rinsed and dried. The printed portions of the goods were colored a deep reddish yellow by the dyestuff of the probable formula:

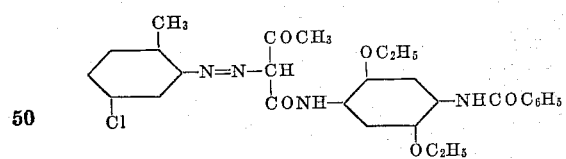

The dyeings possessed a satisfactory degree of fastness to light, chlorine, and laundering.

*Example IV*

A printing paste was prepared according to the following formula:

| | Parts |
|---|---|
| 3-methoxy-4-benzoyl-amino-aceto-acetanilide | 3.0 |
| The diazoimino compound derived from the reaction of diazotized 4-chloro-2-amino-anisole with the sodium salt of piperidine-alpha-carboxylic-acid | 3.0 |
| Cellosolve | 6.0 |
| A 26% solution of sodium-hydroxide | 2.0 |
| Starch-gum tragacanth thickener | 50.0 |
| Water at 160° F | 36.0 |
| Total | 100.0 |

Cotton goods were printed and developed with the above paste as has been described in previous examples. The printed portions of the goods were dyed a reddish yellow by the dyestuff of the probable formula:

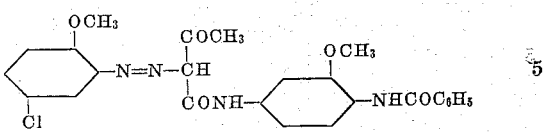

The dyeings showed satisfactory fastness to chlorine, light, and laundering.

*Example V*

The following color components were substituted for those given in the printing paste described in Example I:

| | Parts |
|---|---|
| 3-methoxy-4-benzoyl-amino-aceto-acetanilide | 3.0 |
| The diazoimino derivative prepared by the reaction between diazotized 4-chlor-2-amino-toluene and the sodium salt of piperidine-alpha-carboxylic-acid | 3.0 |

The printing paste was prepared, applied upon cotton goods and developed in the manner described in Example I. The printed portions of the goods were colored a deep reddish yellow by the dyestuff of the probable formula:

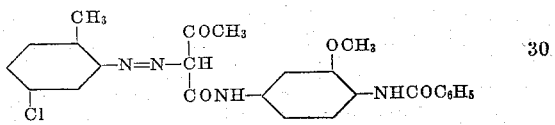

The dyeings showed satisfactory stability to the action of light, chlorine and laundering agents.

*Example VI*

In the printing paste described in Example I, the following color components were substituted for those given in that example:

| | Parts |
|---|---|
| 4-benzyl-amino-aceto-acetanilide | 2.8 |
| The diazoimino derivative of diazotized 4-chloro-2-amino-anisole and piperidine-alpha-carboxylic-acid | 3.2 |

The paste was applied to cotton goods and developed as has already been described. The printed portions of the goods were dyed a dull reddish yellow by the dyestuff of the probable formula:

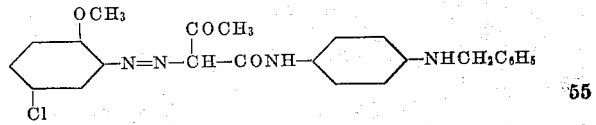

The dyeings possessed a fair degree of stability towards light and chlorine and laundering.

*Example VII*

A printing paste was prepared according to the following formula:

| | Parts |
|---|---|
| Aceto-acetyl-4-furoylamino-2.5-diethoxy-aniline | 3.2 |
| The diazoimino compound derived from the reaction between diazotized 4-chloro-2-amino-anisole and piperidine-alpha-carboxylic-acid in an alkaline medium | 2.8 |
| Cellosolve | 6.0 |
| A 26% solution of sodium-hydroxide | 2.0 |
| Starch-gum tragacanth thickener | 50.0 |
| Water at 140° C | 36.0 |
| Total | 100.0 |

This paste was applied to cotton goods and developed on the fiber in the manner previously described. The printed portions of the goods were dyed a reddish yellow by the dyestuff of the probable formula:

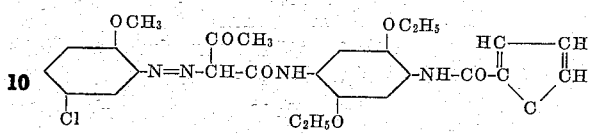

The dyeings showed a satisfactory degree of stability to the action of light, chlorine and laundering agents.

Example VIII

A printing paste was prepared according to the general method already described. The color components used in this example were as follows:

| | Parts |
|---|---|
| The diazoimino compound derived from the reaction between diazotized 4-chloro-2-amino-toluene with piperidine-alpha-carboxylic-acid in an alkaline medium | 2.7 |
| Aceto-acetyl - 4 - furoyl-amino-2.5 -diethoxy-aniline | 3.3 |

The paste was applied to cotton goods and developed on the fiber in the manner previously described. The printed portions of the goods were dyed a reddish yellow by the dyestuff of the probable formula:

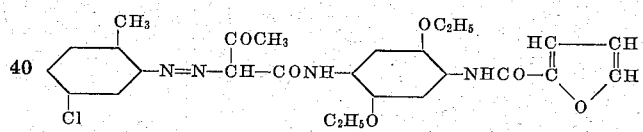

The dyeings possessed a high degree of fastness to light, chlorine, and laundering agents.

Example IX

A printing paste was prepared according to the general method already described. The color components in this instance were as follows:

| | Parts |
|---|---|
| Aceto - acetyl - 3 - benzoyl-amino - 4 - methoxy-aniline | 3.0 |
| The diazoimino compound derived from the reaction between diazotized 4-chloro-2-amino-toluene and piperidine-alpha-carboxylic-acid in alkaline aqueous solution | 3.0 |

The paste was applied to cotton goods and the color developed on the fiber in the usual manner. The printed portions of the goods were dyed a reddish yellow of good fastness qualities by the dyestuff of the probable formula:

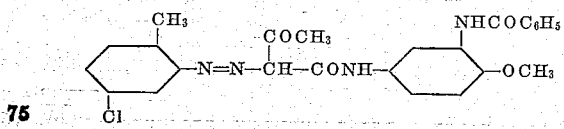

Example X

The substitution of 3.0 parts of the diazoimino derivative of diazotized 4-chloro-2-amino-anisole for the diazoimino compound given in the previous example also will give a printing paste of high quality. The dyeings developed from this paste are reddish yellow in color and show a satisfactory degree of stability to the action of light, chlorine and laundering agents. The composition of the dyestuff is expressed by the formula:

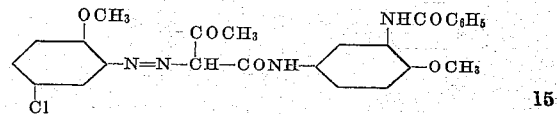

Example XI

A printing paste was prepared according to the following formula:

| | Parts |
|---|---|
| N-(4 - aceto - acetyl-amino-phenyl)-piperidine | 2.7 |
| The diazoimino compound derived from the reaction between diazotized 4-chloro-2-amino-anisole and piperidine-alpha-carboxylic-acid in alkaline aqueous solution | 3.3 |
| Cellosolve | 6.0 |
| A 26% solution of sodium hydroxide | 2.0 |
| Starch-gum tragacanth thickener | 50.0 |
| Water at 140° C | 36.0 |
| Total | 100.0 |

Cotton goods were printed with this paste from an engraved copper roll. The goods were dried and exposed for 1 minute to a 5% acetic-acid ager. The goods were then rinsed, soaped for 1.25 minutes in a 1% soap solution, rinsed and dried. The printed portions of the goods were dyed a dull reddish yellow by the dyestuff of the probable formula:

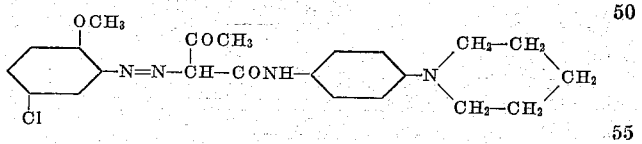

The dyeings possessed a satisfactory degree of fastness to the action of light, chlorine and laundering agents.

Example XII

A printing paste was prepared according to the general method described in the previous example. The color components used in this example were the following:

| | Parts |
|---|---|
| 4-aceto-acetyl-amino-phenyl-morpholine | 2.7 |
| The diazoimino compound prepared by the reaction of diazotized 4-chloro-2-amino-anisole with piperidine-alpha-carboxylic-acid in an alkaline aqueous solution | 3.3 |

The cotton goods were printed with the paste, and the color developed on the fiber as described in previous examples. The printed portions of the goods were dyed a reddish yellow by the dyestuff of the following formula:

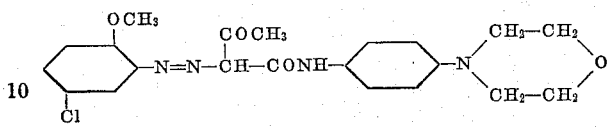

The dyeings possessed a satisfactory degree of stability to the action of light, chlorine and laundering tests.

Tetrazotized arylene-diamines may be coupled to two equivalents of coupling components to produce the compound having the formula:

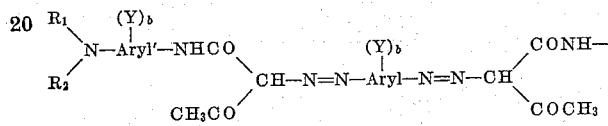

in which the unknowns have the values hereinabove set forth.

In the foregoing examples, the colors have been produced by the use of the diazo-components in the form of their water-soluble diazoimino derivatives, but they may also be produced by the use of the diazo salts prepared from the diazo components, by the use of the nitrosamines (antidiazotates), and by the other methods well-known in the art.

The invention is applicable to the dyeing of cotton, regenerated cellulose, cellulose esters and ethers and, with somewhat less satisfactory results, to the dyeing of wool, silk, and leather.

The examples illustrate the colors as self-shades, but they may be used in mixtures, to produce a wide range of shades. For example, the product of Example III may be incorporated in various ratios with the mixture of the water-soluble diazoimino derivative of 4-chloro-2-aminotoluene and the ortho-phenetidide of 2,3-hydroxy-naphthoic-acid to produce a brilliant orange of excellent fastness by the usual processes of dyeing and printing. As another example, the colors may be applied in combination with reds and blues to yield a wide range of browns and blacks.

As many apparently widely different embodiments of this invention may be made without departing from the spirit and scope thereof, it is to be understood that we do not limit ourselves to the specific embodiments thereof except as defined in the appended claims.

We claim:

1. A dyestuff represented by the formula

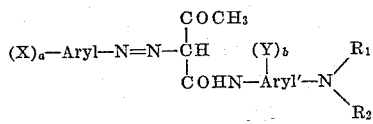

in which X is one of a group consisting of hydrogen and an auxochrome and $a$ is an integer less than the number of carbon atoms in Aryl, Y is one of a group consisting of hydrogen and an auxochrome and $b$ is an integer at least 2 less than the number of carbon atoms in Aryl', $R_1$ is one of a group consisting of hydrogen, alkyl, aryl, and aralkyl, $R_2$ is one of a group consisting of alkyl, aryl, aralkyl, and acyl radicals incapable of coupling with diazo salts.

2. A dyestuff represented by the formula

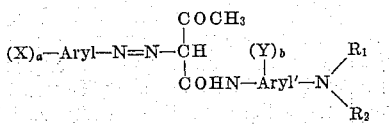

in which X is one of a group consisting of hydrogen and an n-auxochrome and $a$ is an integer less than the number of carbon atoms in Aryl, Y is one of a group consisting of hydrogen and an n-auxochrome and $b$ is an integer at least 2 less than the number of carbon atoms in Aryl', $R_1$ is one of a group consisting of hydrogen, alkyl, aryl, and aralkyl, $R_2$ is one of a group consisting of alkyl, aryl, aralkyl, and acyl radicals incapable of coupling with diazo salts.

3. A dyestuff represented by the formula

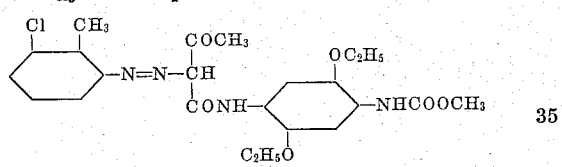

4. A compound formed by reacting a diazotized arylamine with a compound having the formula

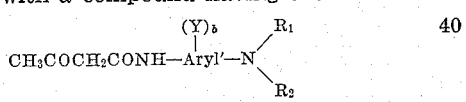

in which Y is one of a group consisting of hydrogen and an auxochrome and $b$ is an integer at least 2 less than the number of carbon atoms in Aryl', $R_1$ is one of a group consisting of hydrogen, alkyl, aryl, and aralkyl, $R_2$ is one of a group consisting of alkyl, aryl, aralkyl, and acyl radicals incapable of coupling with diazo salts.

5. A compound formed by reacting a diazotized arylmonoamine with a compound having the formula

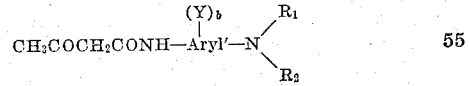

in which Y is one of a group consisting of hydrogen and an n-auxochrome and $b$ is an integer at least 2 less than the number of carbon atoms in Aryl', $R_1$ is one of a group consisting of hydrogen, alkyl, aryl, and aralkyl, $R_2$ is one of a group consisting of alkyl, aryl, aralkyl, and acyl radicals incapable of coupling with diazo salts.

6. A dyestuff represented by the formula

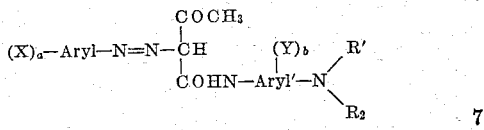

in which X is one of a group consisting of hydrogen and an auxochrome and $a$ is an integer less than the number of carbon atoms in Aryl, Y is one of a group consisting of hydrogen and an auxochrome and $b$ is an integer at least 2 less than the number of carbon atoms in Aryl', $R_1$ is one of the group consisting of hydrogen, alkyl, aryl and aralkyl, $R_2$ is one of a group consisting of alkyl, aryl, aralkyl, and acyl which is incapable of coupling with diazo salts, or $R_1$ and $R_2$ jointly represent a radical of the group consisting of pentamethylene and $$-CH_2-CH_2-O-CH_2-CH_2-.$$

7. Azo-dyestuffs of the following general formula:

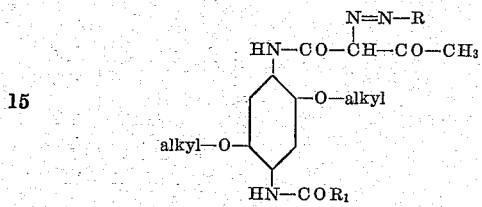

wherein R and $R_1$ stand for radicals of the benzene series.

8. The water-insoluble azo-dyestuff of the following formula:

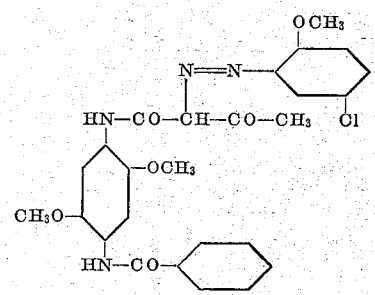

yielding, when produced on the fiber, golden-yellow dyeings of very good fastness to light and to weather.

MILES AUGUSTINUS DAHLEN.
NEWELL MEADE BIGELOW.
FRITHJOF ZWILGMEYER.